J. H. SCHENCK.
Automatic Gate.
No. 55,914. Patented June 26, 1866.
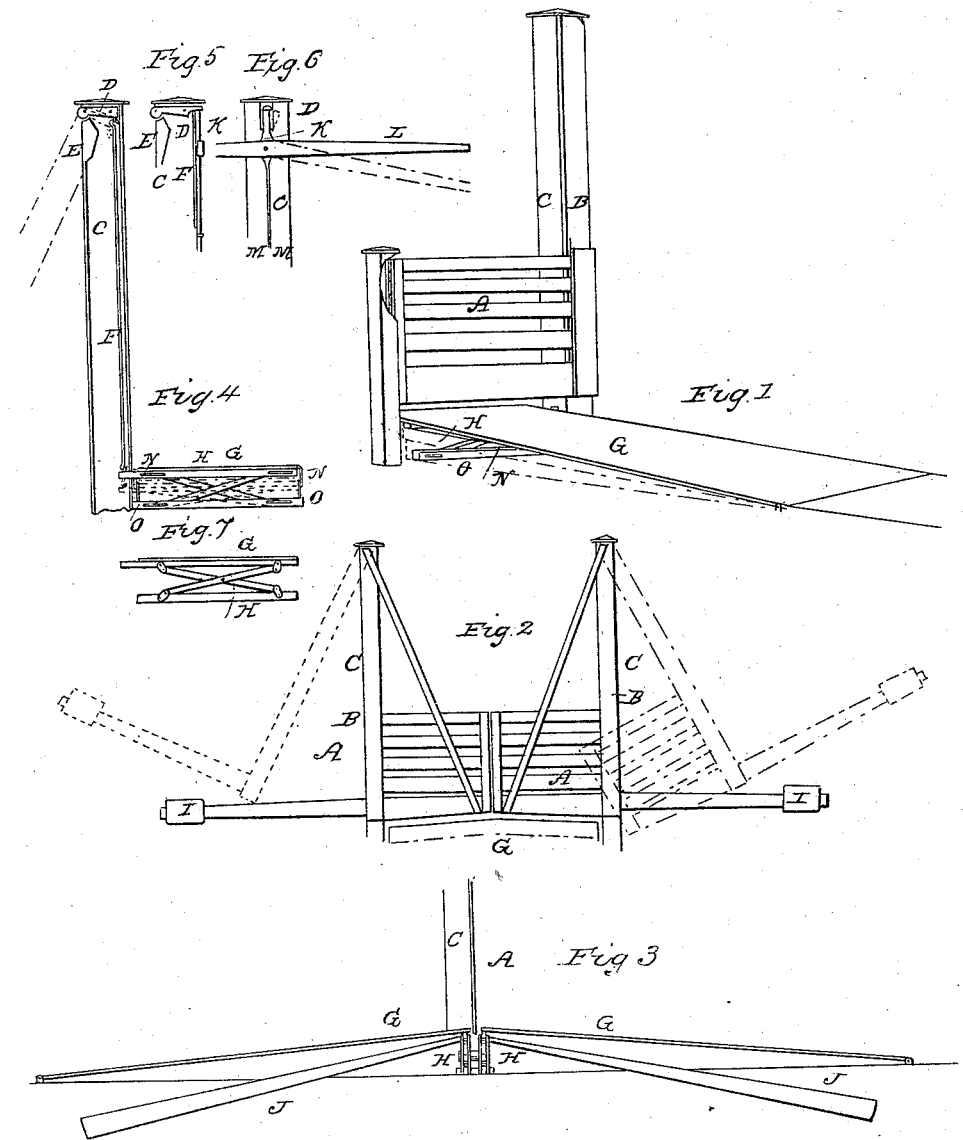

UNITED STATES PATENT OFFICE.

J. H. SCHENCK, OF CHICAGO, ILLINOIS.

IMPROVEMENT IN AUTOMATIC GATES.

Specification forming part of Letters Patent No. 55,914, dated June 26, 1866.

*To all whom it may concern:*

Be it known that I, JOHN H. SCHENCK, of the city of Chicago, in the State of Illinois, have invented a new and useful Improvement in Automatic Gates for Carriage and other Roads; and I do hereby declare the following to be a full, clear, and exact description of the same, reference being had to the accompanying drawings, in which—

Figure 1 is a perspective view of my gate. Fig. 2 is an elevation, showing a double gate with counterpoises. Fig. 3 is an elevation of the platform, with counterpoises. Fig. 4 is a section of gate-post, showing the method of hanging the gate and attaching it to the platform. Fig. 5 is a section of the top of gate-post, showing a mode of attaching cattle-latch. Fig. 6 is a front elevation of top of gate-post, showing the position and operation of the cattle-latch. Fig. 7 is a modified method of attaching the lazy-bars to the platform and bed.

The nature of my invention consists in constructing an automatic gate to swing like a pendulum from the top of a post (where it is suspended) when it is opened, and in operating said automatic gate by means of a sinking platform provided with lazy-bars underneath, so that the platform will sink uniformly wherever upon its surface the weight be placed.

That others may understand the construction and operation of my device, I will more particularly describe it.

A is the gate, constructed in any suitable manner. One of the end uprights, B, is prolonged upward sufficiently to reach the top of the post C, where it is attached firmly to the block D, which lies within the casing of the post and rests upon a knife-edge, E, or an equivalent thereof, so that the front end of D may rise and fall, turning upon the edge E as a pivot.

The front end of the block D is provided with a suitable eye, in which one end of the rod F is hooked. This rod descends from the block D to the platform G, connecting the platform and gate together by that means, so that when the platform sinks the gate will be moved on the pivot E and swing backward from over the pathway, as a pendulum swings. The platform G rests with one end upon the ground at a suitable distance from the gate. That end of the platform is secured by pivots, so that the other end of the platform may rise and fall by moving upon said pivots. That end of the platform which is beneath the gate is supported by the rod F, and the weight of the gate communicated through said rod. Beneath that end of the platform are lazy-bars H H, which, being secured to the platform by means of pins running in slots, as in Figs. 1 and 4, or by means of links, as in Fig. 7, cause the platform to sink down evenly, even when the weight which moves it is not over the center. These are the general features of my invention.

In many situations it may be found necessary to add a counterpoise to help to close the gate. This addition may be made as shown in Fig. 2, where a prolongation of the lower bar of the gate affords facility for hanging a weight, I, more or less heavy, at a distance from the perpendicular of the center of motion of the gate. In other places it may be necessary to add a counterpoise to balance the weight of the platform. This will occur when it is necessary to make the platform very heavy in proportion to the weight of the gate. This manner of balancing the weight of the platform is shown in Fig. 3, where two beams, J, with heavy ends, act as levers of the first order upon the free ends of the platforms, constantly pressing those ends upward. By graduating the weight of the heavy ends of the levers J the platforms and the gate may be perfectly balanced.

To prevent the gate being opened by horses or cattle which may approach it, I place the latch K upon the front of the post C. The gate can then only be opened, after the latch has been removed, by pressing downward upon one end of the lever L. The latch K consists of a stout rod, of either metal or some strong flexible wood, pivoted to the post at a point some eighteen inches below the end of the block D, which is left projecting, as shown in Figs. 5 and 6, for the purpose. That portion of the rod K which is below the pivot is formed very thin and flat, so as to act as a spring to return the upper part of the latch to an upright position as soon as it may be permitted by the closing gate to do so. The lower or spring end of K is secured between two pins, M M, so that it may have a bearing whichever way the latch may be moved. The upper end of the latch K, when in its normal position, lies immediately beneath the projected end of block D, so that said block cannot descend and the gate cannot swing.

When my gate is placed on narrow footways it may generally be constructed with the counter-weight so close to the suspending-bar that it will appear as a part of the gate; for such footways, also, it may only be provided with a single platform, as shown in Fig. 1, for then it will not be inconvenient to step upon the elevated end of the platform in approaching the gate from that side; but when it is applied to carriage or bridle roads a double platform must be used, so that the horse in approaching the gate may only encounter a gentle inclination upward. A double platform of this kind is shown in Fig. 3.

In order to protect the working parts of this device from the effects of snow and ice, I attach the side plates, N O, Fig. 4, to the edges of the platform and to the bed-plates resting on the ground. The plates N, attached to the edges of the platform, overlap at all times the plates O, and a perfect protection is thus formed for all the working parts.

In applying this gate to railroads, it will only be necessary to construct the platform with sufficient strength to bear the track, and to place the counterpoises J J beneath, to raise the platforms again after a train has passed.

It is obvious that the details of construction herein shown and described may be varied in many particulars without at all changing the general design and operation, as a pivot-bolt may be substituted for the knife-edge E, or a latch of different construction may be substituted for the one herein shown, or the platforms or gate may be differently counterpoised; but none of these changes would, in any degree, change the design or operation of the invention.

Among the advantages of my arrangement of devices may be enumerated the following: The working parts are entirely inclosed and protected from the weather. As shown in Fig. 4, the block D, by which the gate is suspended, is within the casing C of the post, and the rod F, by which the platform is suspended, is also within the same casing. The platform may be entirely above ground, and the lazy-bars, beneath it, can never become clogged by snow or ice, because the plates N O at the sides will effectually exclude all wet from the space beneath the platform. The platform must sink equally, whether the weight be over the center or not, because, the lazy-bars being pivoted together at their center, any force which depresses either end must depress the center, and therefore the opposite side must also be depressed, for if the center sinks down it is obvious that both the elevated ends must sink also.

Every part of this gate and its appendages may be made by the farmer himself, or by any person with ordinary skill. There are no complicated parts to become deranged, no cords or pulleys, and hence the apparatus must be inexpensive.

Having described my invention, what I claim as new, and desire to secure by Letters Patent, is—

1. The gate A, pivoted at the top of the post so as to swing like a pendulum when the way is to be opened, substantially as described.

2. In combination with the vibrating gate A, the reciprocating platform, for the purpose set forth.

3. In combination with the vibrating gate A, the latch, substantially as and for the purpose set forth.

4. The reciprocating platform supported upon the lazy-bars and connected to the gate by the rod, substantially as described.

5. In combination with the reciprocating platform, the flanges substantially as described, and for the purpose set forth.

J. H. SCHENCK.

Witnesses:
WM. PAINTER,
R. D. O. SMITH.